United States Patent [19]

Alberts et al.

[11] 4,071,580

[45] Jan. 31, 1978

[54] GRAFT POLYMERS

[75] Inventors: Heinrich Alberts, Cologne; Herbert Bartl, Odenthal, both of Germany

[73] Assignee: Bayer Aktiengesellschaft, Germany

[21] Appl. No.: 662,263

[22] Filed: Feb. 27, 1976

[30] Foreign Application Priority Data

Mar. 4, 1975 Germany .............................. 2509403

[51] Int. Cl.$^2$ .................. C08F 255/02; C08F 263/04; C08F 263/02
[52] U.S. Cl. ................................................. 260/878 R
[58] Field of Search ..................................... 260/878 R

[56] References Cited

U.S. PATENT DOCUMENTS

| | | | |
|---|---|---|---|
| B 465,688 | 1/1976 | Prinz et al. ......................... | 260/878 R |
| 3,853,970 | 12/1974 | Dietrich ............................ | 260/878 R |
| 3,855,353 | 12/1974 | Alberts et al. .................... | 260/878 R |
| 3,856,733 | 12/1974 | Sturt et al. ........................ | 260/878 R |
| 3,901,954 | 8/1975 | Alberts et al. .................... | 260/878 R |
| 3,954,908 | 5/1976 | Nakamura et al. ............... | 260/878 R |
| 3,962,371 | 6/1976 | Alberts et al. .................... | 260/878 R |
| 3,970,718 | 7/1976 | Takahashi et al. ............... | 260/878 R |
| 3,988,390 | 10/1976 | Prinz et al. ....................... | 260/878 R |

*Primary Examiner*—Alan Holler
*Attorney, Agent, or Firm*—Connolly and Hutz

[57] ABSTRACT

A process for the preparation of graft polymers from ethylene homopolymers or copolymers and olefinically unsaturated monomers, especially from ethylene/vinyl ester copolymers, in the presence of a radical forming agent in homogenous or heterogeneous phase, in which a mixture of (meth)acrylonitrile, at least one aromatic vinyl compound and vinylchloride are polymerized in the presence of an ethylene homopolymer or copolymer. The products obtained contain no ungrafted styrene/acrylonitrile copolymer and more than 80% by weight of the graft polymer is chemically almost uniform in structure. The products obtained according to the invention are eminently suitable for use as coating materials and as materials which can be thermoplastically processed.

14 Claims, No Drawings

GRAFT POLYMERS

This invention relates to graft polymers consisting of ethylene homopolymers or copolymers as graft substrate and a mixture of (meth)acrylonitrile, aromatic monovinyl compounds and vinyl chloride as graft monomers, and to a process for their preparation.

It is known that radical grafting of mixtures of styrene and acrylonitrile on ethylene copolymers leads to inhomogeneous graft products which consist of a mixture of graft copolymers, ungrafted graft substrate and free styrene/acrylonitrile copolymer as described in British Patent Specification No. 917,498 and the article by J. L. Locatelli and G. Riess in Angewandte Makromolekulare Chemie 32 (1973), pages 117–129.

The inhomogeneity of the resulting graft products is particularly troublesome in cases where the graft substrate and styrene/acrylonitrile copolymers are incompatible with each other. In some cases, the graft products obtained have properties which make them unsuitable for processing and poor mechanical properties. This applies particularly to the system of polyethylene/styrene-acrylonitrile.

A process for grafting styrene and acrylonitrile in the presence of monoolefines such as propylene or isobutylene has been described in German Offenlegungsschrift No. 2,215,588. The yield of graft product can be dramatically improved by using these olefins as regulators for the process, but it is always possible to use up these regulators quantitatively during the reaction.

It was therefore an object of the present invention to find a grafting process which would result in chemically and molecularly homogeneous graft products and in which the regulator would be virtually completely used up by copolymerisation during the reaction.

This problem can be substantially solved by using 0.01 to 15% by weight, preferably 0.1 to 5% by weight, based on the monomer mixture which is required to be grafted on the substrate, of vinyl chloride as regulator in the grafting reaction.

The present invention thus relates to a process for the preparation of graft polymers from ethylene homopolymers or copolymers and olefinically unsaturated monomers in the presence of a radical forming agent in homogeneous or heterogeneous phase, in which mixtures of (meth)acrylonitrile, at least one aromatic vinyl compound and vinyl chloride are polymerised in the presence of ethylene homopolymers or copolymers.

By ethylene homopolymers are meant polyethylenes which are prepared by known methods of low, medium or high pressure synthesis, which may vary in structure from linear to strongly branched and which have molecular weights, as determined by the method of light scattering, of 5000 or more.

Suitable ethylene copolymers include ethylene/vinyl ester copolymers preferably containing 1 to 75 % by weight, in particular 5 to 50 % by weight, of vinyl esters built into the copolymers. The vinyl esters may be organic vinyl esters of aliphatic saturated monocarboxylic acids containing 1 to 18 carbon atoms, which may be halogen substituted, in particular chlorine substituted or aromatic monocarboxylic acids containing 7 to 11 carbon atoms. The following are specific examples: Vinyl formate; vinyl acetate; vinyl propionate; vinyl chloropropionate; vinyl butyrate; vinyl isobutyrate; vinyl caproate; vinyl laurate; vinyl myristate; vinyl stearate and vinyl benzoate; vinyl acetate is preferred.

The ethylene/vinyl ester copolymers are prepared by known methods of high or medium pressure synthesis, if desired in solvents such as tertiary butanol.

The ethylene/vinyl ester copolymers prepared by the high pressure synthesis method have melt index values of from 0.1 to 100, preferably from 1.0 to 10 and more particularly from 4.5 to 6. The intrinsic viscosities determined in tetralin at 120° C are generally from 0.6 to 1.5. The molecular weights determined by the method of light scattering are preferably from 50,000 to about 1 million. The nonuniformity U defined by the term $(Mw/Mn) - 1$ (G. V. Schulz, in Z. phys. Chem. (B) 43 (1939), pages 25 to 34) is within the range of from 5 to 20. These copolymers are preferably soluble in hot hydrocarbons and may contain up to 40 % by weight of vinyl esters.

The ethylene/vinyl ester copolymers prepared, for example, by the solution polymerisation method and containing, for example, 30 to 75 % by weight of vinyl acetate, preferably 40 to 55 % by weight of vinyl acetate, have melt index values which are in part no longer measurable at 190° C according to DIN 53 735 under a loading of 2.16 kp but may also be greater than 100. The melt index range is preferably below 15, and in particular from 3 to 5. The molecular weights determined by the light scattering method are preferably from 40,000 to 500,000. The nonuniformity U is from 2 to 6.

The vinyl esters used may be the organic vinyl esters mentioned above.

The copolymers are soluble in hydrocarbons and those which have higher vinyl ester contents are also soluble in alcohols and preferably have intrinsic viscosities in toluene at 25° C of from 0.5 to 2.0.

Suitable ethylene copolymers also include the copolymers of ethylene with $\alpha,\beta$-monoolefinically unsaturated carboxylic acids containing 3 to 5 carbon atoms and their derivatives. These copolymers preferably contain from 1 to 80 % by weight, in particular from 1 to 30% by weight, of these carboxylic acid derivatives.

The preferred $\alpha,\beta$-monoolefinically unsaturated carboxylic acids with 3 to 5 carbon atoms are (meth)acrylic acid, crotonic acid, fumaric acid, maleic acid, and itaconic acid. (Meth)acrylic acid and maleic acid are particularly preferred.

Carboxylic acid derivatives of the above mentioned acids may also be used, in particular their monoesters of diesters with 1 to 8 carbon atoms in the alcohol component or their anhydrides.

The graft substrates which yield the best results are ethylene homopolymers and ethylene/vinyl ester copolymers, in particular ethylene/vinyl acetate copolymers.

The ethylene/vinyl ester copolymers may be partly or completely hydrolysed if desired.

The monomers which may be grafted on the substrates include methacrylonitrile and/or acrylonitrile, aromatic monovinyl compounds such as styrene, nuclear substituted alkyl styrenes containing 1 to 5 carbon atoms in the alkyl group, e.g. 4-methylstyrene, $\alpha$-methylstyrene, halogenated styrenes such as 4-chlorostyrene or mixtures thereof, preferably styrene and $\alpha$-methylstyrene and vinyl chloride.

The quantity of monomer mixture used for graft polymerisation is preferably from 5 to 95% by weight, for 5 to 95 % by weight of an ethylene homopolymer or copolymer.

The monomer mixture used for the grafting reaction may vary widely in its percentage composition of the given components.

The monomer mixture consists of the following components:
I. 4.99 to 94.99 % by weight, preferably 10 to 70 by weight and in particular 15 to 45 % by weight of (meth)acrylonitrile,
II. 5 to 95 % by weight, preferably 20 to 89.9 % by weight, in particular 54.9 to 80 % by weight of at least one aromatic monovinyl compound and
III. 0.01 to 15 % by weight, preferably 0.1 to 10 % by weight and in particular 0.1 to 5 % by weight of vinyl chloride,
the sum of components I to III being 100 %.

The invention also relates to polymer-containing graft polymers of ethylene homopolymers or copolymers with polymerised units of mixtures of (meth)acrylonitrile, aromatic monovinyl compounds and vinyl chloride.

The polymers preferably contain graft polymers of
A: 5 to 95 % by weight, preferably 10 to 75 % by weight and in particular 15 to 30 % by weight of ethylene homopolymer or copolymer and
B: 95 to 5 % by weight, preferably 25 to 90 % by weight and in particular 70 to 85 % by weight of polymerised units of
I: 4.99 to 94.99 % by weight, preferably 10 to 70 % by weight and in particular 15 to 45 % by weight of (meth)acrylonitrile
II: 5 to 95 % by weight, preferably 20 to 89.9 % by weight and in particular 54.9 to 80 % by weight of at least one aromatic monovinyl compound and
III: 0.01 to 15 % by weight, preferably 0.1 to 10 % by weight and in particular 0.1 to 5 % by weight of vinyl chloride,
the sum of A + B being 100 % and the sum of components I to III also being 100 %.

Particularly interesting are polymer-containing graft polymers of ethylene/vinyl ester copolymers with polymerised units of mixtures of (meth)acrylonitrile, aromatic monovinyl compounds and vinyl chloride.

These polymers preferably contain graft polymers of
A: 9 to 95 % by weight, preferably 10 to 75 % by weight and in particular 15 to 30 % by weight of ethylene/vinyl ester copolymer and
B: 91 to 5 % by weight, preferably 25 to 90 % by weight and in particular 70 to 85 % by weight of polymerised units of
I: 4.99 to 94.99 % by weight, preferably 10 to 70 % by weight and in particular 15 to 45 % by weight of (meth)acrylonitrile
II: 5 to 95 % by weight, preferably 20 to 89.9 % by weight and in particular 54.9 to 80 % by weight of at least one aromatic monovinyl compound and
III: 0.01 to 15 % by weight, preferably 0.1 to 10 % by weight and in particular 0.1 to 5 % by weight of vinyl chloride,
the sum of A + B being 100 % and the sum of components I to III also being 100 %.

Particularly advantageous for certain purposes are graft polymers consisting of
A: 5 to 95 % by weight, preferably 10 to 75 % by weight and in particular 15 to 30 % by weight of ethylene/vinyl acetate copolymer containing 30 to 75% by weight and preferably 40 to 55 % by weight of vinyl acetate built into the structure and
B: 95 to 5 % by weight, preferably 10 to 75 % by weight and in particular 70 to 85 % by weight of polyerised units of
I: 4.99 to 94.99 % by weight, preferably 10 to 70 % by weight and in particular 15 to 45 % by weight of (meth)acrylonitrile,
II: 5 to 95 % by weight, preferably 20 to 89.9 % by weight and in particular 54.9 to 80 % by weight of at least one aromatic monovinyl compound and
III: 0.01 to 15 % by weight, preferably 0.1 to 10 % by weight and in particular 0.1 to 5 % by weight of vinyl chloride,
the sum of A + B being 100 % and the sum of components I to III also being 100 %.

The monomers are mainly grafted on the graft substrate but minor quantities of homopolymers and/or copolymers of the monomers may also be present.

The grafting reaction according to the invention may be carried out by introducing all the monomers and vinyl chloride into the reaction vessel in the presence of the graft substrate and polymerising, but alternatively the monomers or monomer mixtures and vinyl chloride may be added to the graft substrate either continuously or intermittently.

The radical forming agent may be added in one portion at the beginning of the reaction or continuously or intermittently before, during or after addition of the monomers. In many cases it is advantageous to use several different radical forming agents in the reaction.

For carrying out the grafting reaction, the graft substrate should preferably be in a finely divided or dissolved form if very homogeneous graft products are to be obtained but, in principle, the reaction may also be carried out with coarsely granulated polyethylene of the kind which is obtained, for example, from high pressure polymerisation of ethylene.

If the grafting reaction is to be carried out in solution (homogeneous phase), the following solvents may suitably be used: Saturated aliphatic or aromatic hydrocarbons such as ethane, propane, the isomeric butanes, pentanes, hexanes or mixtures thereof, petroleum ethers, light fraction petroleum hydrocarbons and other petroleum hydrocarbon fractions, benzene, toluene, the xylene isomers and other substituted benzene derivatives such as chlorobenzene, halogenated aliphatic hydrocarbons such as methyl chloride, methylene chloride, chloroform, carbon tetrachloride, trichlorofluoromethane and other chloro-fluorohydrocarbons, trichloroethylene, tetrachloroethylene, difluoroethylene, etc. and low boiling alcohols such as methanol, ethanol, propanol, isopropanol or the isomeric butanols, preferably tertiary butanol.

Dissolving of the graft substrates may be carried out at temperatures of from about 20° C to 120° C if fairly high boiling solvents are used or if the substrates are dissolved at elevated pressure.

The grafting reaction may also be carried out in heterogeneous phase. In that case, the graft substrate may be used in the form of granulates, spherical particles, cylindrical particles, platelets or particles in the form of spirals or other shapes.

If a heterogeneous phase is employed, the graft substrates are preferably in the form of powders or granulates with particles measuring from 1 $\mu$ to 3 cm.

The graft substrates may be brought into contact with the monomer mixture by spraying, brush coating, dipping or dispersing the substrate in the monomer mixture, the monomers then partly or completely swelling into the substrate.

The substrate particles may undergo an increase in volume but retain substantially their original shape. For the swelling process and for the subsequent grafting process, the monomer mixture may be used either undiluted or dissolved in solvents or dispersed in an organic diluent and/or water. The diluents used are similar to the solvents mentioned above which are used for carrying out the grafting reaction in solution. Whether the substrate particles are completely dissolved or merely undergo swelling depends on the quantity and nature of the solvent, the temperature, the pressure and the nature of the graft substrate. Swelling is, of course, accompanied by partial solution of the substrate particles, but the dissolved part of the individual substrate particle substantially remains in the undissolved part of the particle, with the result that the particle retains its original shape in spite of its increase in volume.

Swelling of the graft substrates may be carried out at temperatures of up to about 85° C, if desired in the presence of polymerisation catalysts.

Graft copolymerisation may be carried out in homogeneous or heterogeneous phase at temperatures within a range of from −20° C to 250° C, preferably from 30° C to 150° C, and at pressures of up to 500 excess atmospheres, preferably at pressures of from normal pressure (1 atmosphere) to 21 atmospheres.

The process could also quite well be carried out by first preparing a homogeneous phase of graft substrate, aromatic vinyl compound and vinyl chloride and optionally catalyst and solvent, then dispersing the solution in water and then polymerising, if desired after the addition of catalyst.

Furthermore, the graft substrate particles which have been caused to swell by the monomer mixture, optionally in the presence of a radical forming agent, may be polymerised in the presence of inert or substantially inert gases such as nitrogen or carbon dioxide.

When graft polymerisation is carried out in heterogeneous phase, the graft substrate which has undergone swelling is preferably present in an organic solvent or in water, or in a heterogeneous or homogeneous mixture of solvent and water.

Graft copolymerisation may also be carried out as an emulsion polymerisation. In that case, a polyethylene latex or ethylene/vinyl ester copolymer latex having a solid content of from 20 to 55 % by weight, preferably 25 to 45 % by weight, is further polymerised to a given degree of conversion with continuous addition of the monomers and vinyl chloride on the one hand and of a water initiator solution which may additionally contain emulsifier on the other hand.

The addition of vinyl chloride may, of course, be carried out at the onset of graft polymerisation, or the monomers and initiator solution may be added intermittently. This emulsion graft polymerisation process may also be carried out continuously. Particularly suitable for use as initiators are water-soluble radical-forming agents such as potassium or ammonium peroxy disulphate or redox systems. Suitable emulsifiers include, for example, alkyl sulphates and alkyl sulphonates which have 12 to 24 carbon atoms in the alkyl group, hydrogenated or modified resinic acids such as Dresinate 731 ® of Hercules and saturated or unsaturated carboxylic acids which are modified with polyethylene oxide or propylene oxide. Biologically degradable emulsifiers are preferably used.

The polymerisation catalysts are preferably added to the polymerisation mixture before, during or after the dissolving, swelling or mixing process.

The polymerisation catalysts are preferably used in a quantity of from 0.01 to 1.5 % by weight, based on the sum of graft substrate and graft monomers, although much larger quantities may, of course, be used if desired.

Per-compounds or azo compounds which give rise to radicals may be used as polymerisation catalysts. The following are given as examples: Benzoyl peroxide, tert.-butyl perpivalate, lauroyl peroxide, tert.-butyl peroctoate, tert.-butyl perbenzoate, ditert.-butyl peroxide, tert.-butyl perisononanate, diisopropylpercarbonate, dicyclohexyl percarbonate, acetyl cyclohexylhexanesulphonyl peroxide, dicumyl peroxide, azo-bisisobutyric acid nitrile, etc.. Benzoyl peroxide, tert.-butyl perpivalate, tert.-butyl peroctoate, dicyclohexylpercarbonate, dicumyl peroxide, azo-bis-isobutyric acid nitrile and ditert.-butyl peroxide are particularly suitable.

When the process according to the invention is carried out in aqueous suspension, dispersing agents are necessary for obtaining satisfactory bead polymers. The following are given as examples of dispersing agents: Polyvinyl alcohol and partially saponified polyvinyl acetates, cellulose derivatives and starch derivatives such as methyl cellulose, ethyl cellulose or ethyl hydroxycellulose. Suitable synthetic dispersing agents (copolymers of hydrophilic and hydrophobic monomers) include styrene/(meth)acrylic acid, styrene/maleic acid anhydride and ethylene/(meth)acrylic acid copolymers; copolymers of (meth)acrylic acid esters and (meth)acrylic acid; polyethylene oxides or ethylene-propylene oxide copolymers and polyesters with hydroxyl numbers between 10 and 250. When mixtures of dispersing agents and emulsifiers are used, it is preferred to use biologically degradable emulsifiers. Inorganic salts (for example phosphoric acid derivatives) may also be used. Polymerisation in aqueous suspension is preferably carried out at temperatures of from 40° C to 150° C at about 1 to 25 bar.

The aqueous suspension polymerisation process may also be carried out as a reverse emulsion polymerisation (waterin-oil) or initially in the form of a reverse emulsion polymerisation and finally as a suspension polymerisation of styrene and acrylonitrile in water.

In that case, a solution of the monomers and a radical forming agent (organic phase) is first prepared. Water is then added to the organic phase and a water-in-oil emulsion is produced, preferably with the aid of water-in-oil emulsifiers. The initiators or initiator system may be contained in the water. In the system which is to be polymerised, therefore, the disperse phase is formed by water which may contain part or all of the initiator or initiator system and of the monomers and water-in-oil emulsifier while the remaining monomers or all the monomers form the continuous phase. Copolymerisation may already set in during preparation of the water-in-oil emulsion. After formation of the water-in-oil emulsion (first stage), more water and, if indicated, dispersing agents are added to the water-in-oil emulsion with stirring at the second stage, at which phase reversal gradually takes place. An oil-in-water dispersion is formed, water substantially forming the continuous phase and oil the disperse phase. By the end of polymerisation, the oil droplets dispersed in water have completely solidified to form porous beads which contain water. The water-in-oil emulsifiers which are used in quantities of from 0.05 to 10 % by weight, preferably 0.5 to 4 % by weight, based on the monomers, may include, for example, graft products of styrene or other vinyl monomers on polyethers of ethylene oxide or styrene copolymers containing $\alpha,\beta$-unsaturated carboxylic acids or a 1:1 copolymer of methacrylic acid and methyl ,methacrylate. Other water-in-oil emulsifiers are also suitable, for example those described in British Patent Specifications Nos. 928,621; 926,699; 959,131; 964,195; and 1,076,319; German Patent Nos. 1,300,286 and 1,211,655 and Belgian Patent No. 785,091.

The proportion by weight of aqueous phase to organic phase when preparing the water-in-oil emulsion (first stage) should preferably be within the range of from 0.2:1 to 1:1 A ratio above or below this range may be used, so long as a water-in-oil emulsion can be formed but the ratio of aqueous phase to organic phase should not exceed 3:1. When preparing the water-in-oil emulsion, it is advisable always to add the aqueous phase to the organic phase.

The vinyl chloride may be added with the solution of monomers or at a later stage but at the latest before phase reversal.

The polymerisation temperatures during the first stage are from 30° C to 120° C, preferably from 60° C to 85° C. Polymerisation is preferably continued to a degree of conversion of from 10 % to 60 %.

In the second stage, the ratio by weight of aqueous phase to oil phase is preferably from 1:1 to 3:1 and should not be more than 10:1. Preparation of the water-in-oil emulsion may be carried out at temperatures of from 10° C to 90° C. The addition of water and, if indicated, dispersing agents in the second stage is carried out after formation of the water-in-oil emulsion and heating or cooling to the polymerisation temperature of the second stage, which is from 40° C to 180° C, preferably from 75° C to 150° C.

Substances which have been found suitable for use as dispersing agents are polyvinyl alcohol, partially saponified polyvinyl acetate and alkyl celluloses such as methyl cellulose, alkyl sulphonates or alkyl sulphates. They are used in quantities of from 0.01 to 3 % by weight, preferably 0.5 to 2 % by weight, based on the quantity of monomers used.

One particular advantage of this process lies in the simple method of processing and problem-free drying of the resulting bead polymer, which has a porous structure.

The graft reaction according to the invention may also be carried out using known redox systems which may be composed of peracid compounds, such as potassium persulphate, and inorganic or organic reducing agents, for example as described in Methoden der Organischen Chemie, Houben-Weyl, 4th Edition (1961), Volume 14/1, pages 263-297.

Initiator radicals may also be produced with the aid of ultraviolet irradiation which may be carried out in the presence of peracid compounds with or without sensitizer, X-rays, $\gamma$-rays, or accelerated electrons.

The usual additives such as molecular weight regulators may also be added to the polymerisation reaction mixtures, and, in the case of suspension polymerisation in organic solvents, special dispersing agents such as ethylene/vinyl acetate copolymers containing 45 to 80 % by weight of vinyl acetate or copolymers of (meth)acrylic acid derivatives may also be added.

The process according to the invention may be carried out continously or batchwise. The grafting reaction may be carried out with or without solvent in polymerisation screws and evaporation of the solvent or of the residual monomers from the graft polymerisation mixture may be carried out in evaporation screws, thin layer evaporators or spray driers.

In the process according to the invention, about 50 to 100 % by weight, preferably 80 to 100 % by weight of the styrene and/or (meth)acrylonitrile used as monomers become grafted. Extraction or fractional precipitation invariably yields only minor quantities or none at all of ungrafted styrene/acrylonitrile copolymer; in other words copolymer which has not become chemically linked with the substrate used. By contrast, if the process is carried out in a similar manner but without vinyl chloride, it is frequently found that about 50 % by weight or more of the styrene/(meth)acrylonitrile can be isolated from the reaction mixture as a copolymer which has not become grafted.

Tables 1 and 2 show the results of fractional precipitation of a graft product prepared according to the invention (Example 1) and of a reaction product obtained by conventional methods (Comparison Example 1). The same ethylene/vinyl acetate copolymer was used as graft substrate in both experiments.

Table 1

| Experiment | Ungrafted SAN copolymer | Toluene [$\eta$] |
|---|---|---|
| Example 1 | — | 0.48 |
| Comparison Example 1 | 52 % by weight | 2.31 |
| Ethylene/vinyl acetate copolymer | — | 1.37 |

In the reaction product obtained in Comparison Example 1, 52 % by weight of the styrene/acrylonitrile mixture put into the process are present as ungrafted copolymer and the product has a relatively high intrinsic viscosity compared to that of the substrate used as starting material and the graft product prepared according to Example 1.

The superior chemical uniformity of the graft product prepared according to the invention in Example 1 over the material prepared in the Comparison Example 1 can be seen from the following results of fractionation:

Table 2

| | Example 1: | | | |
|---|---|---|---|---|
| Fraction | % by Weight | [$\eta$]DMF | Acrylonitrile content (% by weight) | Vinyl chloride content (% by weight) |
| 1 | 4.06 | 1.39 | 16.5 | 1.07 |
| 2 | 26.46 | 1.02 | 20.8 | 1.06 |
| 3 | 7.18 | 0.98 | 20.5 | 0.90 |
| 4 | 11.53 | 0.95 | 21.2 | 1.14 |
| 5 | 8.88 | 1.02 | 19.2 | 0.85 |
| 6 | 12.16 | 1.01 | 21.4 | 0.58 |
| 7 | 13.39 | 1.05 | 19.4 | 1.97 |
| 8 | 14.42 | 1.00 | 17.3 | 1.02 |
| Remainder | 6.36 | insoluble in DMF | 7.2 | 1.37 |

Table 2

| | Comparison Example 1: | | |
|---|---|---|---|
| Fraction | % by Weight | [$\eta$]DMF | Acrylonitrile content (% by weight) |
| 1 | 10.5 | insoluble | 16.6 |
| 2 | 50.9 | 3.08 | 19.0 |

Table 2-continued

| Fraction | Comparison Example 1: % by Weight | [η]DMF | Acrylonitrile content (% by weight) |
|---|---|---|---|
| 3 | 10.0 | 1.26 | 25.8 |
| 4 | 14.5 | 0.76 | 25.0 |
| 5 | 8.8 | 0.25 | 24.2 |
| 6 | 2.25 | 0.15 | 16.0 |
| Remainder | 0.3 | | |

The reaction products obtained by the process according to the invention are therefore distinguished by the following characteristics:
1. No ungrafted styrene/acrylonitrile copolymer;
2. A graft product in which invariably more than 80 % by weight is chemically almost uniform in structure;
3. The solubility properties indicated by the [η] values obtained show, in addition to other findings, that the graft chains are relatively short and uniformly distributed over the graft substrate put into the process.

By contrast, reaction products which have been prepared without the use of vinyl chloride as graft activator are not only chemically non-uniform but, according to their widely differing solution viscosities, they are also very non-uniform in their structure. This explains the difficulty with which such graft products can be processed thermoplastically and their undesirable inhomogeneity.

The products of the invention are obtained as solutions, dispersions or solvent-free plastic masses, depending on whether the process was carried out in homogeneous or heterogeneous phase. For example, finely divided thermoplastic powders with an average particle size of less than 1000 μ which are excellent for coating purposes for various powder application methods such as whirl sintering, flame spraying and electrostatic spraying, or for rotational casting can be obtained directly by the process.

The products obtained according to the invention are eminently suitable for use as coating materials and as material which can be thermoplastically processed. Even graft products with high styrene/acrylonitrile contents can be worked up problem-free in the usual machines used in thermoplastic technology. Owing to their excellent compatibility, the graft polymers are in some cases highly transparent. The mechanical strength properties are excellent, in contrast to those of mixtures of thermoplasts, which, as is well known, are completely incompatible and without mechanical strength.

The parts and percentages given in the Examples refer to weight unless otherwise indicated.

To determine the proportion of grafted substance, the portions of ungrafted graft substrte were separated from the grafted substrate and ungrafted polymerised monomer units by simple and/or double fractional precipitation. For this purpose, the graft product was dissolved (e.g. in dimethylformamide, benzene or toluene/dimethylformamide mixtures), and then gradually precipitated in the heat, e.g. with n-butanol or methanol.

The amount of graft substrate in the graft polymer is obtained from the difference between 100 % and the sum of percentages contents of the grafted monomers.

The following standards were employed for the mechanical values measured in the Examples:
Impact strength according to DIN 53 453 at room temperature unless otherwise indicated.
Notched impact strength according to DIN 53 453 at room temperature unless otherwise indicated.
Dimensional stability in the heat according to Vicat corresponding to DIN 53 460 in ° C (described as Vicat temperature in the Examples).
Ball pressure hardness according to DIN 53 456
Bending stress according to DIN 53 452
Tensile strength $\delta_B$ according to DIN 53 455
Elongation $\epsilon$ according to DIN 53 455
E-modulus according to DIN 53 457
Stretching tension $\delta_S$ according to DIN 53 454.

EXAMPLE 1

580 g of an ethylene/vinyl acetate copolymer with a vinyl acetate content of 45 % by weight and a Mooney viscosity of 20 were dissolved at 60° C in 4000 cc of tertiary butanol and 1980 g of styrene in a 12 l stirrer autoclave. 7.5 g of tert.-butyl perpivalate, 636 g of acrylonitrile, and 50 g of vinyl chloride in 1000 ml. of tert.-butanol were then added. The reaction mixture was stirred for 8 hours at 60° C and 2 hours at 80° C. Solvent and remaining monomers were removed from the reaction mixture by steam. 3180 g of a graft polymer with an acrylonitrile content of 19.8 % by weight, a vinyl chloride content of 1.57 % by weight, a styrene content of 60.4 % by weight and an ethylene/vinyl acetate copolymer content of 18.23 % by weight were obtained. The mechanical properties of the graft polymers are shown in Table 3.

EXAMPLE 2

636 g of acrylonitrile, 6.5 g of tert.-butyl perpivalate, 4.5 g of ditert.-butyl peroxide, 200 ml of a 10 % solution of dispersing agent (the dispersing agent used was a 1:1 copolymer of methacrylic acid/methyl methacrylate in the form of an aqueous solution adjusted to pH 6), 0.8 g of sodium pyrosulphite and 2500 ml of water were added with stirring to a solution in 1920 g of styrene of 580 g of an ethylene/vinyl acetate copolymer which had a vinyl acetate content of 45 % by weight and a Mooney viscosity of 20. After the addition of 50 g of vinyl chloride, the mixture was heated to 80° C. A solution of 18 g of sodium dihydrogen phosphate, 2.0 g of an alkylsulphate containing 12 to 14 C atoms in the alkyl chain and 3000 ml of water was pumped in at 80° C at the rate of 750 ml/hour. The reaction mixture was then stirred for one hour at 80° C and 4 hours at 140° C. The remaining monomers were removed from the reaction mixture by steam. 3160 g of a graft copolymer containing 18.8 % by weight of acrylonitrile, 1.58 % by weight of vinyl chloride, 18.3 % by weight of ethylene/vinyl acetate and 61.32 % by weight of styrene were obtained. The mechanical properties of the graft polymers are shown in Table 3.

Table 3

| Example | Impact strength (KJ/m²) | Notched impact strength (KJ/m²) | Vicat ° C | Ball pressure hardness 30"(N/m²) | Flexural F-modulus (KJ/m²) |
|---|---|---|---|---|---|
| 1 | unbroken | 11.2 | 92 | 83 | 2242 |
| 2 | unbroken | 14.7 | 98 | 92 | 2465 |

EXAMPLE 3

4000 cc of water, 100 ml of a 10 % solution of dispersing agent (see Example 2), 200 ml of a 5 % methylcellulose solution in water, 8 g of benzoyl peroxide, 3000 g of an ethylene/vinyl acetate copolymer with a vinyl acetate content of 8.5 % by weight and a melt index at 190° C and 2.16 kp loading of 5.1, 800 g of acrylonitrile, 300 g of styrene and 170 g of vinyl chloride were introduced into a 12 l stirrer autoclave. The reaction mixture was heated with stirring to 50° C for 8 hours and 80° C for 5 hours. 4160 g of a graft product with a vinyl chloride content of 4.0 % by weight, an acrylonitrile content of 17.5 % by weight and a styrene content of 6.5 % by weight were obtained on cooling. The graft product was rolled at 160° C and pressed into plates. The mechanical properties were as follows:

Tensile strength (kp/cm$^2$): 156
Elongation under tension (%): 661

COMPARISON EXAMPLE 1

580 g of an ethylene/vinyl acetate copolymer with a Mooney viscosity of 20 were dissolved at 60° C in 4000 cc of tert.-butanol and 1980 g of styrene in a 12 l stirrer autoclave. 7.5 g of tert.-butyl perpivalate and 636 g of acrylonitrile in 1000 ml of tert.-butanol were then added. Stirring was continued for 8 hours at 60° C and 2 hours at 80° C. Solvent and residual monomers were removed from the reaction mixture with steam. 3070 g of a graft product with an acrylonitrile content of 18.3 % by weight and an ethylene/vinyl acetate copolymer content of 18.8 % by weight were obtained.

The following mechanical properties could be measured:

| | |
|---|---|
| Impact strength (KJ/m$^2$) | 62 |
| Notched impact strength (KJ/m$^2$) | 4.7 |
| Vicat ° C | 96 |
| Ball pressure hardness 30"(N/m$^2$) | 72 |
| Flexural E-modulus (KJ/m$^2$) | 2356 |

We claim:

1. A process for preparing a graft polymer from ethylene homopolymer or copolymer and olefinically unsaturated monomers in the presence of a radical forming agent in homogeneous or heterogeneous phase, wherein a monomer mixture of acrylonitrile or methacrylonitrile, at least one aromatic monovinyl compound and vinyl chloride are polymerized in the presence of an ethylene homopolymer or copolymer.

2. The process of claim 1 wherein said ethylene copolymer is an ethylene/vinyl ester copolymer or a copolymer of ethylene and an α,β-monoolefinically unsaturated carboxylic acid.

3. The process of claim 2 wherein said vinyl ester is derived from an organic carboxylic acid having 1 to 18 carbon atoms.

4. The process of claim 2 wherein said ethylene copolymer is an ethylene vinyl/acetate copolymer.

5. The process of claim 2 wherein said ethylene copolymer is a copolymer of ethylene and an α,β-monoolefinically unsaturated carboxylic acid having 3 to 5 carbon atoms.

6. The process of claim 1 wherein the at least one aromatic monovinyl compound is styrene, styrene substituted in the nucleus with alkyl having 1-5 carbon atoms, α-methylstyrene, halogenated styrene or a mixture thereof.

7. The process of claim 1 wherein 5 to 95% by weight of monomer mixture and 95 to 5% by weight of ethylene homopolymer or copolymer are polymerized.

8. The process of claim 1 wherein the monomer mixture consists of 4.99 to 94.99% by weight of acrylonitrile or methacrylonitrile, 5 to 95% by weight of at least one aromatic monovinyl compound and 0.01 to 15% by weight of vinyl chloride.

9. A graft polymer comprising ethylene homopolymer or copolymer as grafting substrate and having grafted thereon a monomer mixture of acrylonitrile or methacrylonitrile, at least one aromatic monovinyl compound and vinyl chloride.

10. A graft polymer comprising 5 to 95% by weight of ethylene homopolymer or copolymer as grafting substrate and having grafted thereon 95 to 5% by weight of a monomer mixture comprising 4.99 to 94.99% by weight of acrylonitrile or methacrylonitrile, 5 to 95% by weight of at least one aromatic monovinyl compound and 0.01 to 15% by weight of vinyl chloride.

11. The graft polymer of claim 10 wherein the grafting substrate is an ethylene/vinyl ester copolymer.

12. A graft polymer comprising 10 to 75% by weight of ethylene/vinyl ester copolymer as grafting substrate and having grafted thereon 25 to 90% by weight of a monomer mixture comprising 10 to 70% by weight of acrylonitrile or methacrylonitrile, 20 to 89.9% by weight of at least one aromatic monovinyl compound and 0.1 to 10% by weight of vinyl chloride.

13. A graft polymer comprising 10 to 75% by weight of ethylene/vinyl acetate copolymer containing 30 to 75% by weight of vinyl acetate as grafting substrate and having grafted thereon 25 to 90% by weight of a monomer mixture comprising 4.99 to 94.99% by weight of acrylonitrile or methacrylonitrile, 5 to 95% by weight of at least one aromatic monovinyl compound and 0.01 to 15% by weight of vinyl chloride.

14. A graft polymer of 10 to 75% by weight of ethylene/vinyl acetate copolymer containing 40 to 55% by weight of vinyl acetate as grafting substrate and having grafted thereon 25 to 90% by weight of a monomer mixture comprising 10 to 70% by weight of acrylonitrile or methacrylonitrile, 20 to 89.9% by weight of at least one aromatic monovinyl compound and 0.1 to 10% by weight of vinyl chloride.

* * * * *